United States Patent [19]
Russell

[11] Patent Number: 6,050,737
[45] Date of Patent: Apr. 18, 2000

[54] SECURING SYSTEM FOR TRANSPORTING ALL-TERRAIN VEHICLES

[75] Inventor: James Gregory Russell, Walls, Miss.

[73] Assignee: Russell Hill, L.L.C., Olive Brand, Miss.

[21] Appl. No.: 08/980,663

[22] Filed: Dec. 1, 1997

[51] Int. Cl.[7] ........................................ F16B 7/06
[52] U.S. Cl. .............................. 403/43; 410/7; 410/103
[58] Field of Search .................................. 403/43, 44, 45, 403/46, 47, 48; 248/499; 410/7, 10, 11, 12, 103

[56] References Cited

U.S. PATENT DOCUMENTS

| | | |
|---|---|---|
| Re. 19,337 | 10/1934 | Butterworth . |
| 1,366,732 | 1/1921 | Hoyt ........................................... 403/44 |
| 1,374,963 | 4/1921 | Stevenson . |
| 2,024,444 | 12/1935 | Friedlaender . |
| 2,376,336 | 5/1945 | Brown . |
| 2,742,865 | 4/1956 | Chandler et al. . |
| 2,822,144 | 2/1958 | Jones . |
| 3,140,850 | 7/1964 | Packard ................................. 403/43 X |
| 3,416,763 | 12/1968 | Moreno . |
| 4,247,235 | 1/1981 | Sunesson . |
| 4,272,933 | 6/1981 | Lopes . |
| 4,273,484 | 6/1981 | Blanar . |
| 4,441,736 | 4/1984 | Shedden . |
| 4,852,779 | 8/1989 | Berg . |
| 5,156,482 | 10/1992 | Owings ..................................... 403/43 |
| 5,702,196 | 12/1997 | Petercsak ............................. 403/43 X |
| 5,765,957 | 6/1998 | Connell ..................................... 403/46 |
| 5,782,078 | 7/1988 | Brantley ............................... 403/46 X |

*Primary Examiner*—Terry Lee Melius
*Assistant Examiner*—William L. Miller
*Attorney, Agent, or Firm*—Patrick D. Kelly

[57] ABSTRACT

An all-terrain vehicle (ATV) can be secured to a truck or trailer bed, for transporting on roads or highways, using adjustable-length connectors with rigid shafts, rather than chains, ropes, or cables. Two steel "tine pins" (or comparable rigid structures, such as rounded eye hooks) are securely mounted on opposed ends or sides of the ATV. Similar tine pins are also mounted on the bed of a trailer or truck used to carry the ATV. The ATV is loaded onto the trailer or truck, moved into position (this does not require precise placement) and secured by turnbuckle-type securing connectors which have adjustable lengths. Unlike chains or ropes, these adjustable connectors become rigid and non-yielding after their lengths have been adjusted. An eyehole which accommodates a tine pin is provided at each end of each connector. The eyeholes should contain sleeve-type devices mounted in a rotating or swivelling manner, to allow the sleeves to fit snugly on the tine pins and minimize wear and abrasion on the tine pins and connectors during transport. After the connectors have been slid over the tine pins, they are tightened to exert tension on the connectors, which compresses the suspension of the ATV. This system has been tested and provides excellent performance, allowing safe high-speed travel on highways, while allowing complete security and safety for the ATV on a trailer or truck that is crossing rough or sloped roads or terrain.

3 Claims, 3 Drawing Sheets

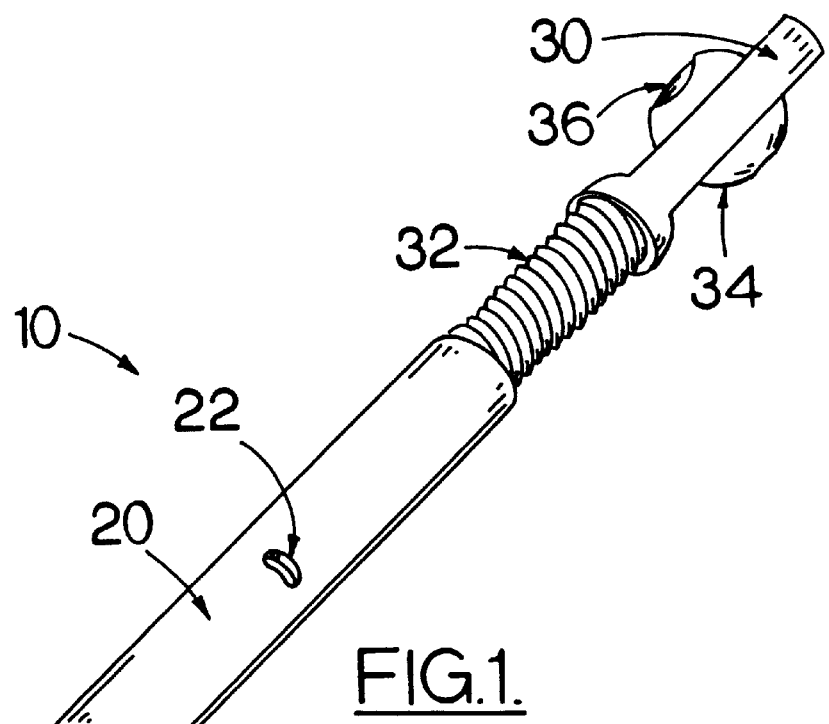
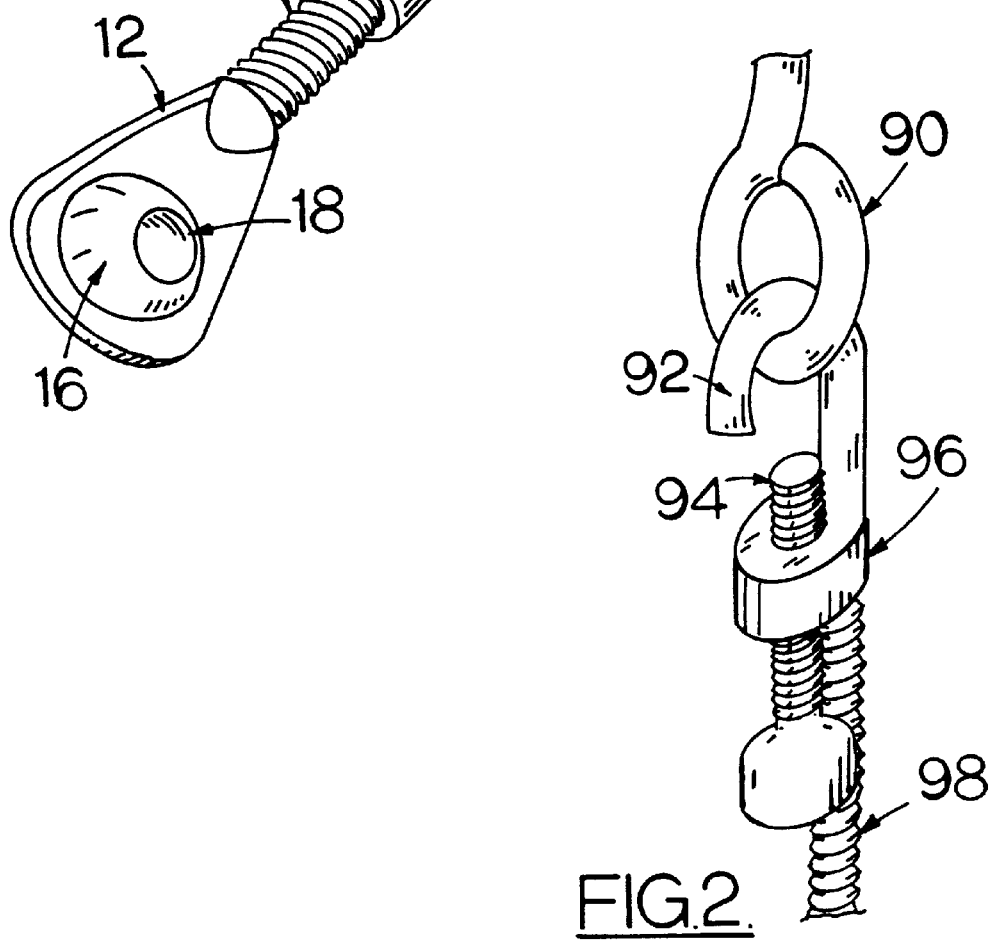

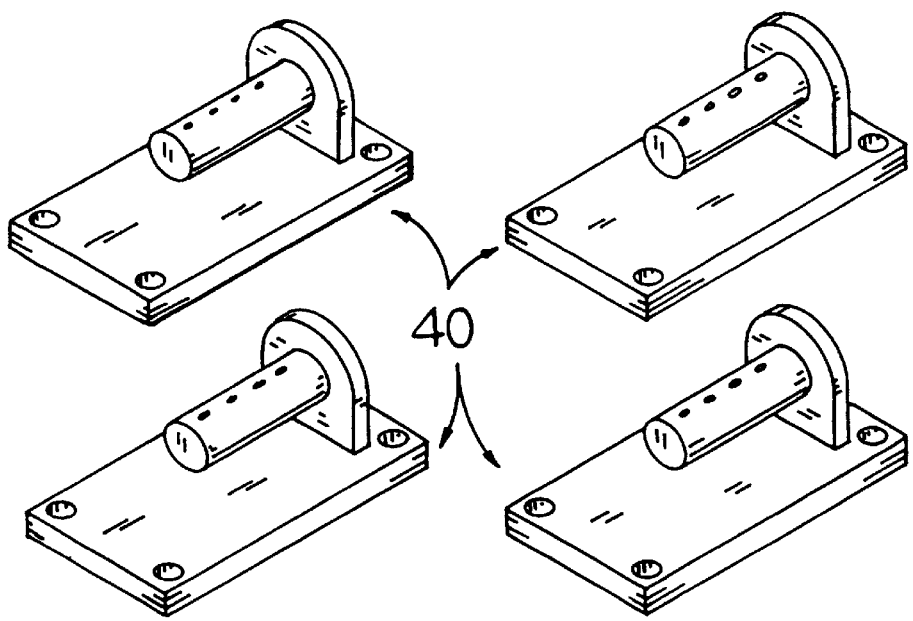
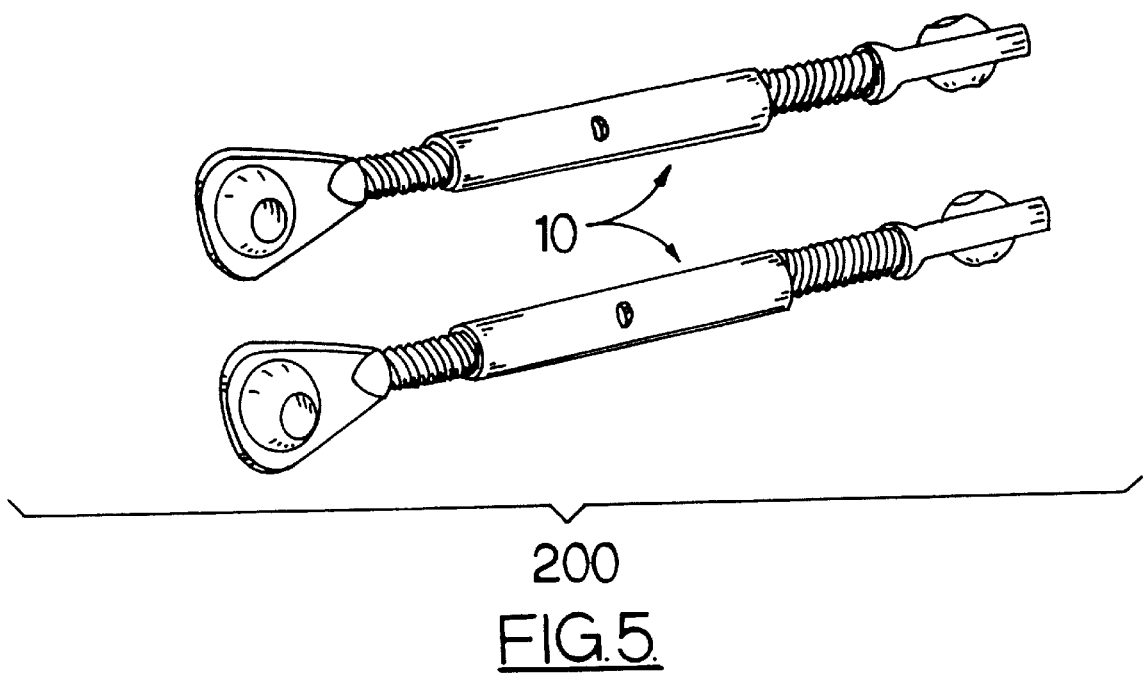
FIG. 5.

SECURING SYSTEM FOR TRANSPORTING ALL-TERRAIN VEHICLES

BACKGROUND OF THE INVENTION

This invention relates to devices for securing all-terrain vehicles on trucks or trailers, for hauling purposes.

The term "all-terrain vehicle" (abbreviated as ATV) is used herein in the conventional sense, as used in magazines such as *ATV Magazine* (Ehlert Publishing Group, Minnetonka, Minn.). Examples include (but are not limited to) the Honda Foreman 400, the Yamaha Big Bear, the Kawasaki Bayou 300, and the Polaris Scrambler 500. In general, they are gasoline-powered vehicles having three or four wheels (this excludes motorcycles and snowmobiles), designed for carrying an adult driver across rough and uneven terrain while the driver rides on a seat that is open and exposed (rather than in a closed or closable passenger compartment). Most ATV's have four-wheel drive, but some have 2-wheel drive; nearly all use high-traction tires with tractor-type or comparable treads. Although ATV's are used widely for recreation, they are also very useful in various types of outdoor work and business, such as surveying terrain, monitoring and maintaining pipelines and utility lines, caring for livestock, etc.

Because most ATV's are not properly equipped to be driven on public roads, and because they usually cannot be driven safely at highway speeds, it is often necessary to transport an ATV from an office, warehouse, or other storage site, to a location where it will be started, driven, and used. To accomplish this type of transport, an ATV is usually loaded into the bed of a pickup truck or towable trailer.

Prior to this invention, most ATV's have been secured to a truck or trailer by any of several means, such as chains or ropes wrapped around various parts of the ATV, such as the axles, wheels, towing hitch, etc.

The Applicant herein is an engineer who owns and runs a surveying and engineering company that uses ATV's in its work. In his experiences with ATV transport, he has discovered that chains, ropes, and other conventional securing means are sometimes inadequate for securing ATV's on pickup trucks or trailers. Under various conditions, ATV's that have been loaded on trailers for transport can pose a substantial danger of working their way loose and causing substantial damage, to themselves and possibly to the transporting vehicle and to nearby traffic.

These problems are aggravated by the suspension systems used on ATV's. The suspension systems that make ATV's capable of climbing and crossing rugged terrain, and which also make them lively, bouncy, and fun to ride for recreational users, can also make ATV's very difficult to secure in a safe and reliable manner. Indeed, with their weight and spring-mounted suspensions, ATV's that are secured with just ropes or chains can sometimes seem to take on the characteristics of large animals that are determined to break free.

To minimize such problems, a truck or trailer carrying an ATV often must be driven at speeds which are substantially lower than the speed limit on a typical highway. However, in business use, the requirement for slow transport speed wastes time, manpower, and other resources; in recreational use, it cuts down on the amount of enjoyable recreation time.

Fixed-point securing systems, which involve devices such as non-adjustable brackets or other comparable devices that are welded in fixed positions on a trailer or truck bed also are not preferred for transporting ATV's, for at least two reasons: (1) it is difficult and tedious to precisely align an ATV adequately in a rigid system on a truck or trailer, especially if the ATV's wheels are caked with mud or dirt, and (2) a rigid system might damage an ATV (or a truck or trailer) during transport, if the truck or trailer hits a large pothole, rock, or other obstruction in the road.

Accordingly, one object of this invention is to disclose an improved means and method for securing an ATV in a truck or trailer bed, for transporting the ATV to and from a site where the ATV will be used.

Another object of this invention is to disclose a means and method for safely and reliably securing an ATV in a truck or trailer, in a manner which allows the truck or trailer to travel at higher rates of speed than can be safely achieved when ropes or chains are used.

SUMMARY OF THE INVENTION

This invention discloses means and methods for securing an all-terrain vehicle (ATV) to a truck or trailer bed, so that the ATV can be transported safely, even at maximum lawful speeds on conventional roads or highways. This is accomplished by securely affixing two steel "tine pins" (or comparable rigid structures, such as rounded eye hooks) to opposing ends or sides of the ATV, at appropriate positions near the front and back ends. These tine pins can be parallel to the axles of the ATV, so that they will not alter the clearance of the vehicle or pose a risk of jabbing or damaging anything when the ATV is being ridden. Similar tine pins are also affixed to the bed of a trailer (or truck) that will be used to carry the ATV. At the start of a trip, an ATV is loaded onto a trailer or truck, moved into position in a manner which does not require precise placement, and secured by means of turnbuckle-type "securing connectors" which have adjustable lengths, but which become rigid and non-yielding after their lengths have been set to accommodate an ATV. An eyehole which can accommodate a tine pin is provided at each end of each securing connector. Preferably, the eyeholes should contain sleeve-type devices mounted in a rotating or swivelling manner in a flange device; this will allow the sleeves to fit snugly and securely on the tine pins, reducing wear and abrasion on the tine pins and turnbuckles during transport. After the securing connectors have been coupled to the tine pins, they are tightened to exert moderate tension on the ATV. If desired, they can also be secured in place on the tine pins by means of retainer clips. This system has been tested and provides excellent performance, combining safe high-speed travel on highways while also allowing complete security and safety for the ATV on the trailer or truck when traversing rough roads or terrain.

BRIEF DESCRIPTION OF THE DRAWINGS

FIG. 1 depicts an adjustable securing connector, which can be used to secure an ATV's tine pin to a trailer's tine pin.

FIG. 2 depicts an alternate type of clamping device, which can be used to couple a securing connector to a tine pin or eyelet on an ATV or trailer.

FIG. 5 illustrates a kit for retrofitting the tie-down devices of this invention to an existing ATV.

DESCRIPTION OF THE PREFERRED EMBODIMENTS

Figure 3:
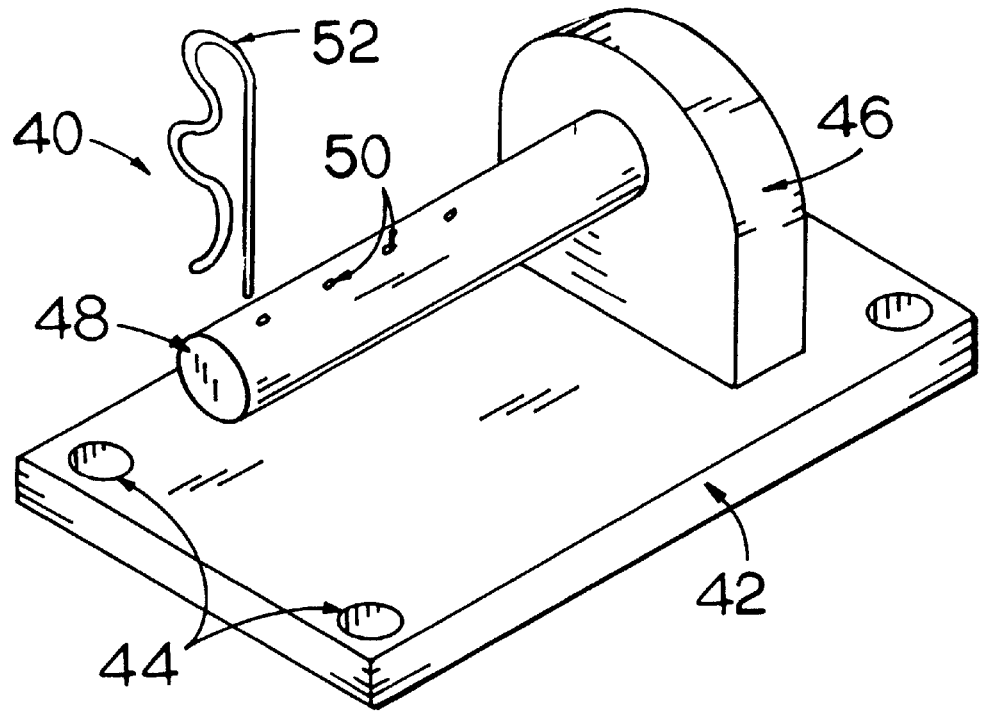
FIG. 3 depicts a tine pin welded to a mounting plate which can be bolted or welded to a trailer or truckbed.

As summarized above, this invention discloses means and methods for securing an all-terrain vehicle (ATV) to a truck or trailer bed, so that the ATV can be transported safely at high speeds on conventional roads or highways. All references herein to "high speeds" refer to speeds which equal or approach the maximum lawful speeds on conventional highways, such as about 50 to about 70 miles per hour (about 80 to 110 kilometers per hour).

Referring to the drawings, callout number 10 in FIG. 1 refers to a "securing connector" assembly. Such securing connectors, and the various components that are assembled to make these securing connectors, are commercially available, and can be purchased in automobile parts stores and in some hardware stores.

For convenience, the discussion below will refer only to trailers. However, it should be understood that such comments are also generally applicable to trucks.

Securing connector 10 comprises a first eyehole flange 12 which is coupled to a threaded shaft 14 having a right-hand thread (i.e., when the shaft 14 is turned in the direction of the extended fingers on a right hand, the shaft will be driven in the direction of the outstretched right thumb, and will travel further into sleeve component 20). Securing connector 10 also comprises a second eyehole flange 30, which is coupled to a threaded shaft 32 having a left-hand thread.

The sleeve component 20 is provided with accommodating internal threads at both ends. It is also provided with a means for rotating it with the aid of a wrench or other tool. In FIG. 1, sleeve 20 is shown as a round cylinder, and the rotating means is shown as hole 22, which passes through both opposed walls of the cylinder, so that a steel bar can be inserted through the holes and used to rotate the sleeve 20. Alternately, sleeve 20 can be provided with a wall portion which is square, hexagonal, or has any other desired non-circular shape, so that an open-end or adjustable wrench can be used to turn the sleeve.

If the two eyehole flanges 12 and 30 are prevented from rotating, forcible rotation of the sleeve 20 will alter the length of the securing connector. Rotation in one direction will pull both of the threaded shafts 14 and 32 into the sleeve 20. This procedure will be used to tighten (i.e., shorten the length of) the securing connector 10, when an ATV is being secured to a trailer for high-speed transport. Conversely, rotation of the sleeve in the opposite direction will extend the two threaded shafts 14 and 32, allowing the securing connector 10 to be removed from the tine pins when it is time to remove the ATV from the trailer.

In most cases, it will not be necessary to take extra steps to lock a securing connector at a specific level of tightness, after it has been tightened. They normally do not work loose quickly, and will stay sufficiently tight to provide adequate security and safety during most normal trips. However, if desired, a securing connector can be locked at a desirable level of tightness by any of several means, depending on the design of the sleeve. For example, if a hole is provided through both walls of a connector sleeve at a midpoint location, a clip can be inserted through the hole and attached to a short chain. The other end of the chain can be clipped to any suitable attachment point on the trailer, truckbed, or ATV, to prevent the clip from being pulled away if the sleeve tries to rotate during travel. Alternately, securing connectors are available with ratcheting mechanisms. Such ratcheting mechanisms allow a sleeve to be tightened, but they require an additional step (such as depressing a button, or moving a lever to a different position) before a sleeve can be loosened.

In one preferred embodiment, eyehole flange 12 contains an eyehole piece 16 which is mounted in a manner that allows it to rotate, or swivel, within the eyehole flange 12. The eyehole piece 16 has a cylindrical orifice 18 passing through it, with a diameter slightly larger than the tine pins, to allow each eyehole piece 16 to be slid over a tine pin.

In one possible embodiment, rotation of the eyehole piece can be unconstrained; this type of eyehole piece would be made from a completely spherical ball, as shown in FIG. 1. In an alternate embodiment, the orifice 18 can be extended beyond the reach of the ball, by means of an extended sleeve-type device; this type of eyehole piece would still be able to rotate a generous amount, but rotation would be constrained by the extended sleeve tips.

The eyehole flange 30 at the opposite end of the connector device 10 also has a rotatable eyehole piece 34, with an orifice 36 passing through it to hold a tine pin.

This embodiment, with rotatable eyehole pieces 16 and 34 at both ends of a connector device 10, is well-suited for minimizing abrasion and wear on the securing connectors and the tine pins. However, it should be recognized that various other clamps, hooks with spring-mounted closure devices, or other reversible connecting devices alternately can be used if desired, so long as they can interact properly with tine pins, closed eyelets, or other comparable attachment devices affixed to an ATV and/or trailer or truckbed. For example, FIG. 2 depicts an eyelet device 90 mounted on an ATV, which interacts with a clamp-type hook 92 which has a threaded locking screw 94 passing through a threaded ear or lug component 96 on the shaft of hook 92. The threaded shaft 98 of hook 92 interacts with the sleeve of a securing connector, in the manner previously described. Such devices would likely cause higher levels of abrasion and wear (compared to connectors with rotatable eyehole pieces) on both the connector devices and on any securing eyelets or other devices mounted on an ATV and a trailer or truckbed; accordingly, they are not highly preferred, but can be used if desired.

Also, it should be recognized that while many common and inexpensive types of securing devices, such as hooks with spring-mounted closure devices, can provide adequate levels of tension on a connector device to pull an ATV down toward the trailer or truck bed, they cannot provide a desirable level of protection against certain types of jarring and hammering forces that can occur during transport across a bumpy road.

For example, if a wheel of a trailer carrying an ATV hits a large pothole in a highway while travelling at high speed, the trailer bed will drop suddenly, as the wheel drops into the pothole. The ATV will also drop, along with the trailer, pulled down by the tension on the connector pieces. However, an instant later, the trailer wheel will hit the far edge of the pothole, and the trailer bed will be jarred, possibly quite hard, in an upward direction. A securing connector (such as a hook with a spring-mounted closure device) that does not provide a rigid and secure attachment cannot prevent the ATV from bouncing downward toward the trailer bed for an instant, while the ATV suspension becomes even more compressed, losing the tension in the connecting device. An instant later, the ATV will jerk back upward, hard, as the suspension springs of the ATV try to force themselves back into a relaxed position. When this happens, the ascending ATV will exert a "hammering" force on the attachment pins and the hook-type securing devices. In addition, this type of jerking motion can also cause any open-type hooks (if attached to a chain, rope, bungee cord, etc.) to become unhooked, which poses a threat of complete loss of control over the ATV, which might fall off of the trailer, severely damaging the ATV and possibly causing a traffic accident.

Because of this factor, securing devices which provide rigid control of their length, and which equally resist both tension and compression, offer better protection than non-rigid devices (such as hooks) against the types of hammering forces that can be encountered on a highway with potholes or other uneven surfaces. Preferred types of connectors (which includes connectors with rotatable eyehole pieces at each end, as shown in FIG. 1) will allow the larger and more heavy-duty suspension system of a trailer or truck to absorb and minimize the hammering-type shocks that might be encountered during transport.

Figure 4:
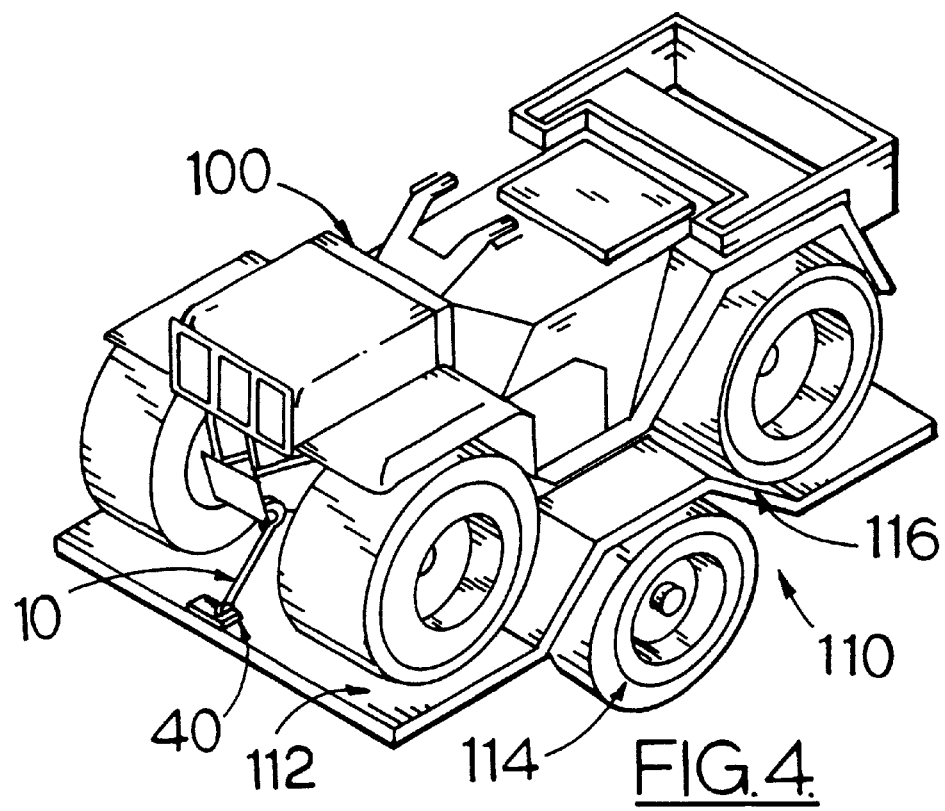
FIG. 4 depicts an ATV which has been loaded on a towable trailer, and secured using two adjustable securing connectors.

FIG. 3 depicts a trailer tine pin assembly 40 that can be permanently affixed to a trailer or truckbed (such as trailer 100 in FIG. 4). This tine pin assembly 40 comprises a mounting plate 42, which can be welded to a steel trailer component, and which can also be bolted to any suitable surface by means such as bolt holes 44. Pin support plate 46 is permanently affixed to mounting plate 42, by means such as welding (alternately, a plate assembly can be molded, forged, or formed by a hot bending process if desired). A tine pin 48 is inserted through a hole in pin support plate 46, and permanently affixed to the support plate 46 by means such as welding, preferably on both sides of the plate 46. In general, smooth-surfaced tine pins should be used; threaded pins are likely to become badly caked and coated with mud and dirt.

Tine pin 48 is provided with a plurality of spaced holes 50 along at least a portion of its length. This allows a retaining clip 52 to be inserted through one of the holes 50, to ensure that the end of a securing connector 10 cannot slip off of a tine pin 48 while an ATV is being transported.

Preferably, two tine pins should be mounted on an ATV, preferably at or near the front and back ends of the ATV, to provide good attachment points at opposing ends of the ATV. The pins should be attached to semi-sheltered locations, so they will not create significant additional protrusions that might extend beyond the prior perimeter of the ATV. Suitable attachment points are available on any ATV. For example, the front ends of most ATV's are provided with a so-called "front rack", which is a lattice made of welded steel bars, that serves as a combination bumper and brush guard. A tine pin attachment plate can be securely attached to any such steel rack, using attachment means such as U-shaped bolts with threads on both ends. Similarly, the back ends of most ATV's are (or can be) fitted with a trailer hitch, or at least a horizontal hitch plate, to allow the ATV to be used as a towing vehicle in rough terrain. Such front racks, trailer hitches, and various other structural components and attachments all offer good locations for mounting tine pin attachment plates to the front and rear of an ATV.

If desired, an owner or mechanic can drill two or more holes through a structural plate or other component, in order to provide additional flexibility for mounting a tine pin attachment plate in a suitable location on the front or back of an ATV. Since not all front racks or rear hitch plates will have exactly the same dimensions, a variety of tine pin attachment kits can be sold, if desired, to be retrofitted onto ATV's. Each attachment kit can be designed and manufactured to fit one or more specific makes and models of ATV's. This would be comparable to buying any of several different types of headlight replacement bulbs, for various different makes and models of cars or trucks.

In addition, if this method of securing ATV's for high-speed transport on highways is adopted by one or more manufacturers, front and rear tine pins can be provided by ATV manufacturers either as standard equipment, or as an option which any purchaser can order.

Preferably, the tine pins should be attached to an ATV at a location at each end which is above the axle of the ATV, mounted on a component such as a front rack or a rear hitch plate. If the tine pins are attached at locations which are in effect, above the suspension system of the ATV, two benefits can be provided. First, when the securing devices are tightened at both ends of the ATV, the suspension springs of the ATV will be compressed slightly. As the suspension springs resist this compression, they will exert a steady tension on the tightened securing devices. This can minimize repeated hammering-type shocks on the securing devices and the ATV; such low-level shocks, from irregularities in the road surface, will be absorbed and minimized by the suspension system of the trailer or truck. In addition, by exerting a pulling-down tension on the top structure of the ATV, above the suspension, the risk of substantial swaying, rocking, and other lateral forces on the ATV can be minimized. This can minimize the risk of a rollover during high crosswinds, sharp turns, and roads or other surfaces that slope steeply toward one side or the other.

Also, tine pins or other attachment devices designed to be affixed to a truckbed or trailer can be provided with means (such as threaded ends, bayonet-type coupling devices, etc.) that will allow the attachment devices to be conveniently disconnected and removed, if they interfere with other desired uses of the truck or trailer.

FIG. 4 depicts a trailer 110, with a platform 112 and an axle with a tire 114 mounted to each end of the axle. ATV 100 is secured to trailer 110 by a front securing connector 10 and a rear securing connector (not shown). Trailer 110 is a simplified depiction; it does not show taillights, a front hitching device, or other components necessary for highway use. If desired, a wheel well 116 can be provided, and the bed component may be made of or covered by sheet metal, to reduce splattering of mud or water up from the highway onto the ATV. This type of trailer can be towed behind any truck or automobile that has adequate power, using a conventional hitching device (not shown) welded to the front end of the trailer, which can be coupled during use to a trailer hitch mounted on the car or truck.

If desired, the trailer can be provided with a ramp gate (not shown), attached to the rear end of the trailer bed 112 by means of hinges, so that the edge of the ramp gate can be lowered to the ground to provide an inclined ramp, to facilitate loading and unloading of the ATV onto and off of the trailer. However, this is not essential, and boards can be used to provide such a ramp if desired. The trailer bed 112 can also be provided with guard railings around the periphery, if desired. Alternately, the entire trailer can be enclosed with walls and a roof, if desired, to provide convenient closed storage for the ATV, to protect the ATV against the weather and reduce the risk of theft.

Accordingly, when the method of this invention is described in claim terminology, it comprises the following steps:

a. rolling an all-terrain vehicle which has been provided with first and second rigid vehicular attachment components (such as tine pins, as shown in FIGS. 3 and 4) at two opposed locations on the vehicle (preferably at the front and back of the vehicle; alternately, at the sides of the vehicle if desired), onto a vehicular platform (such as a truckbed, or a towable trailer) which has been provided with at least two rigid platform attachment components (such as tine pins) at corresponding locations on the platform;

b. positioning the ATV on the platform in a manner which places each vehicular attachment component in proximity to a platform attachment component;

c. coupling a first securing connector (such as the turnbuckle device shown in FIG. 1) having (i) a rigid shaft of adjustable length and (ii) first and second connecting components (such as rotatable eyelets) positioned at both opposed ends of the rigid shaft, to the first vehicular attachment component and to a proximately-positioned platform attachment component;

d. coupling a second securing connector having (i) a rigid shaft of adjustable length and (ii) first and second connecting components positioned at both opposed ends of the rigid shaft, to the second vehicular attachment component and to a proximately-positioned platform attachment component;

e. manipulating each of said first and second securing connectors in a manner which shortens its length, thereby exerting sustained tension on each of said first and second securing connectors, thereby pulling the ATV in a downward direction in a manner which reduces motion of the ATV relative to the platform when the platform is being towed, thereby allowing safe and secure transportation of the ATV on the platform at a maximum lawful highway speed.

This invention also discloses a kit, containing a total of four tine pins (two will be mounted on the ATV, and the other two will be mounted on the truck or trailer), and two adjustable-length securing connectors, such as the devices shown in FIG. 1. A kit 200 is illustrated in FIG. 5, containing four tine pin assemblies 40 and two connectors 10.

Thus, there has been shown and described a new and useful means for securing an all-terrain vehicle on a trailer or truck, to allow high-speed transport of the ATV across roads and highways. Although this invention has been exemplified for purposes of illustration and description by reference to certain specific embodiments, it will be apparent to those skilled in the art that various modifications, alterations, and equivalents of the illustrated examples are possible. Any such changes which derive directly from the teachings herein, and which do not depart from the spirit and scope of the invention, are deemed to be covered by this invention, as claimed below.

What is claimed:

1. A kit having components for securing an all-terrain vehicle on a vehicular platform in a manner which enables high-speed transportation of the all-terrain vehicle on the vehicular platform, the kit comprising four rigid tine pin assemblies and two securing connectors, wherein:

a. two of the tine pin assemblies are suited for mounting on the all-terrain vehicle, each assembly comprising (i) a mounting plate designed to be securely affixed to the all-terrain vehicle; (ii) a tine pin with a first affixed end and a second free end, which has suitable length, thickness, and strength for securing the all-terrain vehicle to the vehicular platform during transportation; and (iii) means for permanently affixing the first end of the tine pin to the mounting plate such that the tine pin is non-rotatable with respect to the mounting plate;

b. two of the tine pin assemblies are suited for mounting on the vehicular platform, each assembly comprising (i) a mounting plate designed to be securely affixed to the vehicular platform; (ii) a tine pin with a first affixed end and a second free end, which has suitable length, thickness, and strength for securing the all-terrain vehicle to the vehicular platform during transportation; and (iii) means for permanently affixing the first end of the tine pin to the mounting plate such that the tine pin is non-rotatable with respect to the mounting plate;

c. two securing connectors having adjustable lengths, each connector comprising (i) a first end component which is designed to be coupled and secured to the respective all-terrain vehicle tine pin assembly; (ii) a second end component which is designed to be coupled and secured to the respective vehicular platform tine pin assembly; and (iii) a shaft component which connects the two end components in a manner which provides means for adjusting the length of the securing connector to a desired length.

2. The kit of claim 1, wherein each of said securing connectors comprises:

a. the first end component comprising a threaded shaft having a right-handed thread, affixed to a first connecting component selected from the group consisting of hooks, eyelets, and clamps;

b. the second end component comprising a threaded shaft having a left-handed thread, affixed to a second connecting component selected from the group consisting of hooks, eyelets, and clamps;

c. a rigid sleeve which is threaded at both ends, with an accommodating right-handed thread at one end and an accommodating left-handed thread at the opposed end of the sleeve which allow the sleeve to engage the threaded shafts of the first and second end components in a manner which allows the securing connector to be adjusted in length by rotating the sleeve, after the first and second connecting components have each been coupled to the respective tine pin assembly.

3. The kit of claim 1, wherein each of said securing connectors comprises at least one of said end components having a rotatable eyelet with an orifice passing therethrough, secured in a rotatable manner inside a non-moving flange component.

* * * * *